United States Patent Office 2,804,316
Patented Aug. 27, 1957

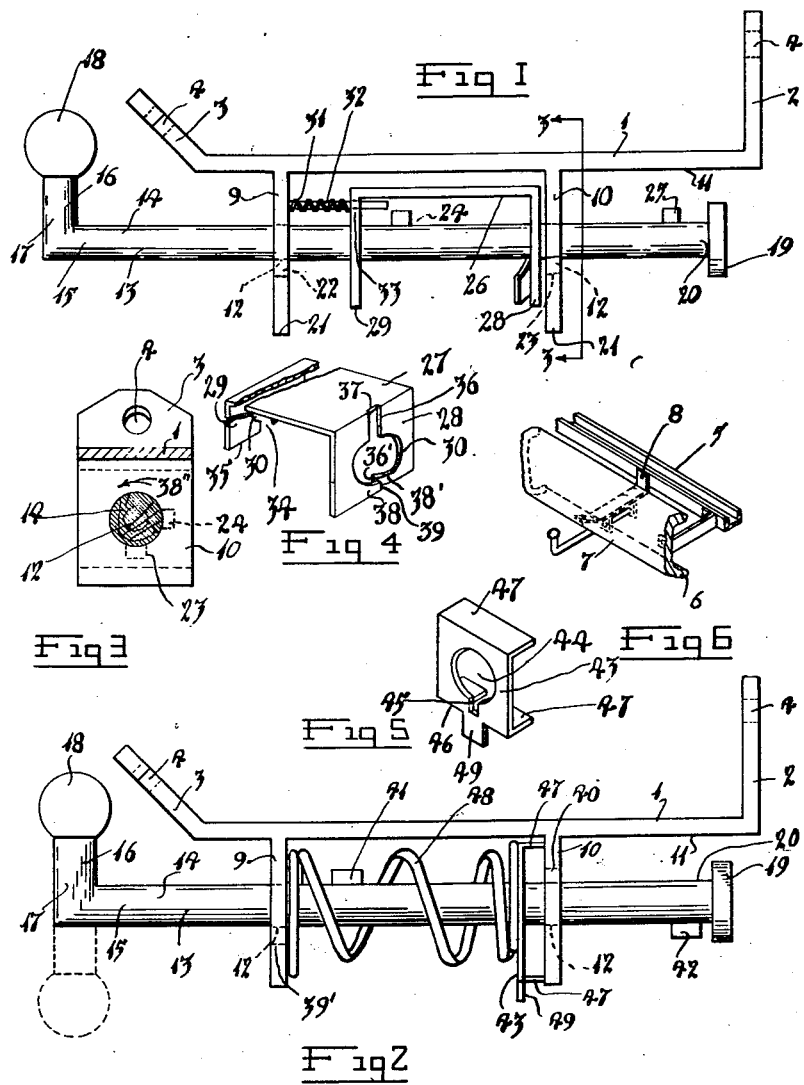

2,804,316

RETRACTABLE AND EXTENSIBLE TOWING BAR FOR AUTOMOBILES

Bruno Derksen, Steinbach, Manitoba, Canada

Application January 19, 1955, Serial No. 482,816

1 Claim. (Cl. 280—491)

My invention relates to new and useful improvements in towing means for automobiles, particularly towing means adapted to be secured adjacent the rear bumper and frame of the automobile, the principal object and essence of my invention being to provide a device of the character herewithin described in which the towing means can be extended when in use and retracted below the rear bumper of the car when not in use.

A further object of my invention is to provide a device of the character herewithin described which is adapted to be mounted between the rear frame member and the bumper, thereby providing further support for the load on said towing means.

Yet another object of my invention is to provide a device of the character herewithin described which is readily retracted and extended as required and which, furthermore, is locked in the desired position.

Still another object of my invention is to provide a device of the character herewithin described which is extremely simple in construction, economical in manufacture, and otherwise well suited to the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 1 is a side elevation of one embodiment of my device.

Figure 2 is a side elevation of an alternative embodiment of my device.

Figure 3 is a sectional view substantially along the lines 3—3 of Figure 1.

Figure 4 is a perspective view of the U-shaped component of Figure 1.

Figure 5 is a perspective view of the plate in Figure 2.

Figure 6 is a reduced fragmentary perspective view showing the relative position of my device when in situ upon the rear of an automobile.

In the drawings like characters of reference indicate corresponding parts in the different figures.

The principal disadvantage of conventional towing means secured to automobiles is the fact that they extend rearwardly from the rear bumper when not in use and cause a considerable hazard to the front of other automobiles that the rear of the automobile may come in contact therewith, either during parking or driving. In other words, the extending bar often penetrates the grill and radiator of the other car, whereas normally the bumpers of the two cars would prevent this damage occurring. I have overcome this principal disadvantage by providing a towing bar which is extendable and retractable at will, and which furthermore is locked in the desired position when needed.

Proceeding now to describe my invention in detail, reference should first be made to Figure 1, which shows the first embodiment of my device. This includes an elongated supporting member 1 formed from flat stock or the like, and having a rear end 2 extending upwardly at right angles therefrom, and a front end 3 inclining forwardly, as clearly illustrated. The ends 2 and 3 are apertured as, for example, at 4 and are adapted to engage between the rear frame member 5 of an automobile and the inside surface of the lower flange 6 of a rear bumper 7 thereof by means of bolts 8 or similar means, as shown in Figure 6.

A pair of bearing brackets 9 and 10 extend downwardly from the underside 11 of the component 1 in spaced and parallel relationship, as clearly shown, these brackets being apertured centrally as at 12, it being understood that the apertures are in alignment one with the other.

A towing bar component collectively designated 13 comprises a shaft 14 adapted to be supported freely for endwise movement by brackets 9 and 10 due to the engagement of said shaft with the afore-mentioned apertures 12. At the forward end 15 of the shaft 14 towing attachment means 16 are provided and take the form, in this embodiment, of a relatively short shaft 17 extending upwardly at right angles to the end 15 and being surmounted by a ball 18, which is a conventional component of towing bars. A shoulder 19 is secured to the rear end 20 of shaft 15 and prevents displacement of the shaft 15 from the bearing brackets 9 and 10 once the device is assembled, it being understood that the diameter of the shoulder 19 is greater than the apertures 12.

Formed adjacent the lower edges 21 of the bearing brackets 9 and 10 are slots 22 and 23 respectively, said slots being shown in phantom in Figure 1 and in full line in Figure 3. These slots bound or join the apertures 12 at this point, as clearly shown.

Lugs 24 and 25 are formed on shaft 15 intermediate the ends thereof on the side of the shaft from which the towing attachment means 16 extend and it should be noted that the afore-mentioned slots 22 and 23 are of a size sufficient to permit passage therethrough of lugs 24 and 25, as will hereinafter be described.

Means collectively designated 26 are provided between the bearing brackets 9 and 10 and cooperate with the slots 22 and 23 and the lugs 24 and 25 to extend and retract the towing bar as desired. This means, which is shown in detail in Figure 4, includes an upper portion 27 and downwardly depending arms 28 and 29, the arms 28 and 29 are apertured as at 30 and permit the U-shaped bracket to be engaged over the shaft 14, it being understood that shaft 14 is freely slidable therethrough.

This U-shaped bracket is normally engaged against the rear bracket 10 by means of extension spring means 31 surrounding rod 32. This rod is secured, at its forward end, to front bearing bracket 9 and passes freely through aperture 33 within the front arm 29 of the U-shaped bracket 26, so that the spring reacts between the bracket 9 and the U-shaped bracket 26. A slot 34 in the rear arm 29 of the bracket 26 extends between the lower edge 35 thereof and the aperture 30, as clearly shown in Figure 4. A further slot 36 is formed in the opposite arm 28 diametrically opposite to slot 34 and extends between the point 37 and the aperture 30, it being understood that slots 34 and 36 are of a similar size to slots 22 and 23 and permit passage of lugs 24 and 25. A further relatively narrow slot 36' extends between aperture 30 and the lower edge of arm 38, it being noted that the portion 38' of the arm is bent inwardly at this point.

Describing now the operation of the first embodiment as hereinabove set forth, the towing bar 15 is shown in the partially retracted position in Figure 1. In order to extend and lock this bar in the extended position, same has to first be rotated through approximately one hundred and eighty degrees, so that the lugs 24 and 25 are in diametrically opposite positions to that shown in Figure 1. The bar may then be drawn leftwardly with regard to Figure 1, lug 24 passing first through slot 34 in the bracket 26 and then through slot 22 in the bracket 9. Lug 25 passes first through slot 23 and bracket 10 and then engages the portion 38 of the arm 28 so that further leftward movement of the shaft 14 moves the U-shaped bracket 26 against the pressure of spring 31 so that the lug 25 passes completely through aperture 23 in bracket 10. Lug 24 at this time also being clear of slot 22 in bracket 9, permits the shaft to be rotated through a further one hundred and eighty degrees in the direction of arrow 38" (see Figure 3) to take up the radial position shown in Figure 1, at which time the lug 25 has passed between arm 28 and bracket 10 and is in alignment with slot 36 in bracket 26. At this point, the spring 31 exerts pressure against the bracket and causes same to engage the inner surface of bracket 10, so that the lug 25 is locked securely within slot 36. This is the fully extended position and the full thrust load of the towing bar is transferred via lugs 24 and 25 to brackets 9 and 10.

When it is desired to retract the bar, bracket 26 is moved leftwardly by hand against pressure of spring 31, thus disengaging slot 36 from lug 25. The towing bar 14 may then be rotated through one hundred and eighty degrees until the lugs 24 and 25 align with slots 22 and 23 respectively, at which time it may be moved rightwardly with regard to Figure 1, lug 24 passing through slot 34 in bracket 26. Towing bar 14 is moved rightwardly until lug 24 hits point 38 on the inward side of bracket 26. Now by virtue of the inwardly bent segment on arm 28, bar 14 may be rotated in the direction of arrow 38", thus forcing back (leftwards) the entire bracket 26 against spring 31 and thus locking away the bar in the retracted position because lug 24 is now engaged between the outer surface of arm 28 and the inner surface of bracket 10 at a point generally indicated by the reference character 39.

Turning next to a description of the embodiment shown in Figure 2, the main components are similar, and where this similarity exists, reference characters the same as those used in Figure 1 have been used.

In this embodiment, however, a slot similar to slot 22 in Figure 1 is formed in the front bearing bracket 9 and has been given the reference character 39'. The rear bracket 10 is provided with a slot 40 of similar configuration to slot 39', but diametrically opposite thereto, it being understood that both slots 39' and 40 communicate with the apertures 12, as hereinbefore described.

A lug 41 is formed on shaft 14 on the same side and in a similar position to lug 24 in Figure 1, but in this embodiment the rear lug 42 is formed on the shaft in a position diametrically opposite to lug 41, as clearly shown.

Means for locking the bar in the extended or retracted position is provided and takes the form of a vertically situated plate 43 shown in detail in Figure 5.

Plate 43 is centrally apertured as at 44 for engagement over shaft 14 and is provided with a slot 45 adjacent the lower edge 46 thereof, said slot communicating with aperture 44 in a manner similar to that hereinbefore described. Flanges 47 extend at right angles from the plate 43 adjacent the upper and lower edges thereof, said flanges being adapted to bear against the bearing bracket 10 and being maintained in that position by means of an extension spring 48 surrounding the shaft 14 and reacting between front bearing bracket 9 and the plate 43. A tab 49 extends below the lower edge 46 of plate 43 and permits same to be moved, as will hereinafter be described.

The towing bar 13 is shown in the partially extended or retracted position in Figure 2 and for the purpose of describing the operation of this embodiment, it will be assumed that it is in the process of being extended.

The shaft 14 is first rotated through one hundred and eighty degrees to take up the position shown in phantom in Figure 2. In this position, it is then moved leftwardly with relation to Figure 2, so that lug 41 passes through slot 39' and lug 42 passes through slot 40. Lug 42 engages the inner surface of plate 43 and rocks same leftwardly, so that the shaft 15 can be rotated back to its original position (through one hundred and eighty degrees), at which time lug 42 comes into engagement with slot 45 in plate 43 and the spring 48 forces plate 43 into the position shown in Figure 2, thus locking the shaft against further rotation. The full thrust of the towing bar is then transferred via lugs 41 and 42 to bearing brackets 9 and 10.

When it is desired to retract the bar, the plate 43 is rocked leftwardly with relation to Figure 2 by means of tab 49 so that the plate clears the lug 42 and permits the shaft to be rotated through one hundred and eighty degrees. This permits the shaft to be moved rightwardly with relation to Figure 2, so that lug 41 passes through slot 39' and lug 42 passes through aperture 40. It is moved rightwardly in this position until lug 41 engages slot 45 in plate 43, whereupon the plate may be moved leftwardly by means of tab 49 so that the shaft 14 can be rotated through ninety degrees and is thus held firmly in the retracted position by the spring loading of plate 43 against the lug 41, which is situated between this plate and the rear bearing bracket 10.

Since various modifications can be made in my invention as hereinabove described, and many apparently widely different embodiments of same made within the spirit and scope of the claim without departing from such spirit and scope, it is intended that all matter contained in the accompanying specification shall be interpreted as illustrative only and not in a limiting sense.

What I claim as my invention is:

A towing bar for automobiles and the like adapted to be secured between the automobile chassis and the rear bumper thereof, comprising in combination an elongated supporting member securable to said chassis and said bumper, a pair of bearing brackets depending from said supporting member in spaced and parallel relationship, a towing bar component journalled for end shifting movement within said brackets and parallel to said supporting member, said towing bar component including a shaft and towing attachment means on the forward end of said shaft, said shaft including a pair of projecting lugs, and means slidably mounted between said brackets and on said shaft adapted to co-operate with said lugs whereby said shaft may be extended or retracted and locked against endwise movement in said positions, said brackets including apertures for bearing support of said shaft, slots bounding said apertures adapted to pass said lugs, said towing attachment means extending at right angles to said shaft, the forward of said lugs being formed on the said side of said shaft as that from which said towing attachment means extends, the rearward of said lugs being formed on the opposite side of said shaft, said slot in said forward bracket being formed adjacent the lower edge of said bracket, said slot in said rear bracket being formed diametrically opposite to said last-mentioned slot, said means slidably mounted comprising a vertically situated apertured plate surrounding said shaft, horizontally situated flanges formed at right angles on the upper and lower edges of said plate and extending rearwardly therefrom, extension spring means surrounding said shaft and reacting between the forward of said brackets and said plate, normally maintaining said plate against the rearward of said brackets, and a slot bounding said aperture in said plate adjacent the lower edge thereof.

References Cited in the file of this patent

UNITED STATES PATENTS

| | | |
|---|---|---|
| 2,544,185 | Sargent | Mar. 6, 1951 |
| 2,671,674 | Derksen | Mar. 9, 1954 |
| 2,685,468 | Blocker et al. | Aug. 3, 1954 |